United States Patent
Lugasy

(10) Patent No.: US 12,420,173 B2
(45) Date of Patent: Sep. 23, 2025

(54) METHODS CIRCUITS DEVICES SYSTEMS NETWORKS AND FUNCTIONALLY ASSOCIATED MACHINE EXECUTABLE CODE FOR A MULTIPART DYNAMIC DIGITAL PUZZLE

(71) Applicant: Zion Lugasy, Kiryat-Tivon (IL)

(72) Inventor: Zion Lugasy, Kiryat-Tivon (IL)

( * ) Notice: Subject to any disclaimer, the term of this patent is extended or adjusted under 35 U.S.C. 154(b) by 0 days.

(21) Appl. No.: 18/444,712

(22) Filed: Feb. 18, 2024

(65) Prior Publication Data

US 2024/0299839 A1    Sep. 12, 2024

Related U.S. Application Data

(60) Provisional application No. 63/450,396, filed on Mar. 7, 2023, provisional application No. 63/446,866, filed on Feb. 19, 2023.

(51) Int. Cl.
| | | |
|---|---|---|
| *A63F 9/10* | (2006.01) | |
| *A63F 13/65* | (2014.01) | |
| *A63F 13/80* | (2014.01) | |

(52) U.S. Cl.
CPC .............. *A63F 9/10* (2013.01); *A63F 13/65* (2014.09); *A63F 13/80* (2014.09); *A63F 2009/1072* (2013.01)

(58) Field of Classification Search
CPC .. A63F 9/10; A63F 13/65; A63F 13/80; A63F 2009/1072
See application file for complete search history.

(56) References Cited

U.S. PATENT DOCUMENTS

| | | | |
|---|---|---|---|
| 2011/0127718 A1* | 6/2011 | Wescom | A63F 9/10 83/13 |
| 2011/0148040 A1* | 6/2011 | Bianco | A63F 7/0664 273/157 R |
| 2012/0025462 A1* | 2/2012 | Knowlton | A63F 9/10 273/157 R |
| 2017/0326445 A1* | 11/2017 | Kim | A63F 9/0612 |
| 2021/0308559 A1* | 10/2021 | Ramirez | A63F 9/18 |

* cited by examiner

*Primary Examiner* — Thomas H Henry
(74) *Attorney, Agent, or Firm* — Vladimir Sherman

(57) ABSTRACT

Disclosed is a multipart dynamic digital jigsaw-puzzle. Two or more physical parts or tabs are each adapted to present, over a digital display functionally associated therewith, a sub section of a provided digital image. The physical parts/tabs, when arranged in a specific orientation or arrangement, collectively recreate the original digital image from its sub sections. Connection elements retain adjacent puzzle parts/tabs to one another.

15 Claims, 16 Drawing Sheets

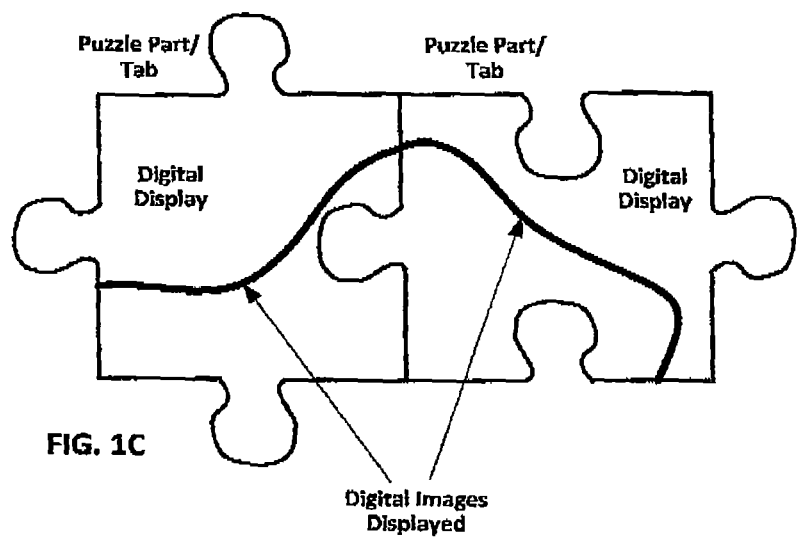

ejectable protrusions/
pins/shafts (retracted)

Thick Oriented Part/Tab Pressed Down to its Thin Orientation – Ejecting Shafts Connection ejectable protrusions/
pins/shafts (extracted)

METHODS CIRCUITS DEVICES SYSTEMS NETWORKS AND FUNCTIONALLY ASSOCIATED MACHINE EXECUTABLE CODE FOR A MULTIPART DYNAMIC DIGITAL PUZZLE

RELATED APPLICATIONS SECTION

The present application is claims priority from U.S. Provisional Patent Application Nos. 63/446,866, filed Feb. 19, 2023, and 63/450,396, filed Mar. 7, 2023. All listed related applications are hereby incorporated by reference in their entirety.

FIELD OF THE INVENTION

The present invention generally relates to the fields of recreational and mind exercise games. More specifically, the present invention relates to methods, circuits, devices, systems, networks, and functionally associated machine executable code, for multipart dynamic digital puzzle/jigsaw-puzzle.

BACKGROUND

A jigsaw puzzle is a tiling puzzle that requires the assembly of often irregularly shaped interlocking and mosaiced pieces, each of which typically has a portion of a picture. When assembled, the puzzle pieces/parts/tabs produce a complete/entire picture/image.

There remains a need, in the fields of recreational and mind exercise games, for jigsaw puzzles facilitating changeable playing capabilities, wherein the assembled picture may be dynamically selected and/or altered.

SUMMARY OF THE INVENTION

Embodiments of the present invention include methods, circuits, devices, systems, networks, and functionally associated machine executable code, for a multipart dynamic digital puzzle/jigsaw-puzzle.

A multipart dynamic digital puzzle/jigsaw-puzzle, in accordance with some embodiments, may include two or more physical parts/tabs, each adapted to present, over a digital display functionally associated therewith, a sub section of a provided digital image, Such that the physical parts/tabs, when arranged in a specific orientation/arrangement, collectively recreate the original digital image from its sub sections. Various connection elements may be utilized to retain adjacent puzzle parts/tabs to one another.

A multipart dynamic digital puzzle/jigsaw-puzzle system, in accordance with some embodiments, may include a computerized device application for: receiving a dataset/file representing a digital image, generating two or more datasets/files each representing a sub section of the received digital image, and communicating each of the two or more datasets/files to a separate part/tab, of the two or more physical parts/tabs, for presentation.

A puzzle/jigsaw-puzzle part/tab, in accordance with some embodiments, may include one or more elements to facilitate/limit its physical connection/fitting/assembly with/to another puzzle/jigsaw-puzzle part/tab. Such elements may for example include: a specific physical shape (e.g. blank, hole, socket, knob, loop, key) complementing the shape of another puzzle/jigsaw-puzzle part/section, a graphic shape or symbol complementing/matching/completing the graphic shape or symbol of another puzzle/jigsaw-puzzle part/section.

According to some embodiments, the arrangement of the two or more physical parts/tabs, in the specific orientation that recreates the original digital image from its sub sections, may trigger a digital notification. The notification may be generated by one or more of the two or more physical parts/tabs and/or by the computerized device application in response to a successful/correct (i.e. recreates the original digital image) parts/tabs arrangement message received from one or more of the parts/tabs.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings:

In FIG. 1C there is shown, in accordance with some embodiments, an exemplary multipart dynamic digital puzzle/jigsaw-puzzle system, wherein the parts/tabs, and their respective digital displays, are shaped in the form of classic jigsaw-puzzle matching pieces;

Figure 1A:
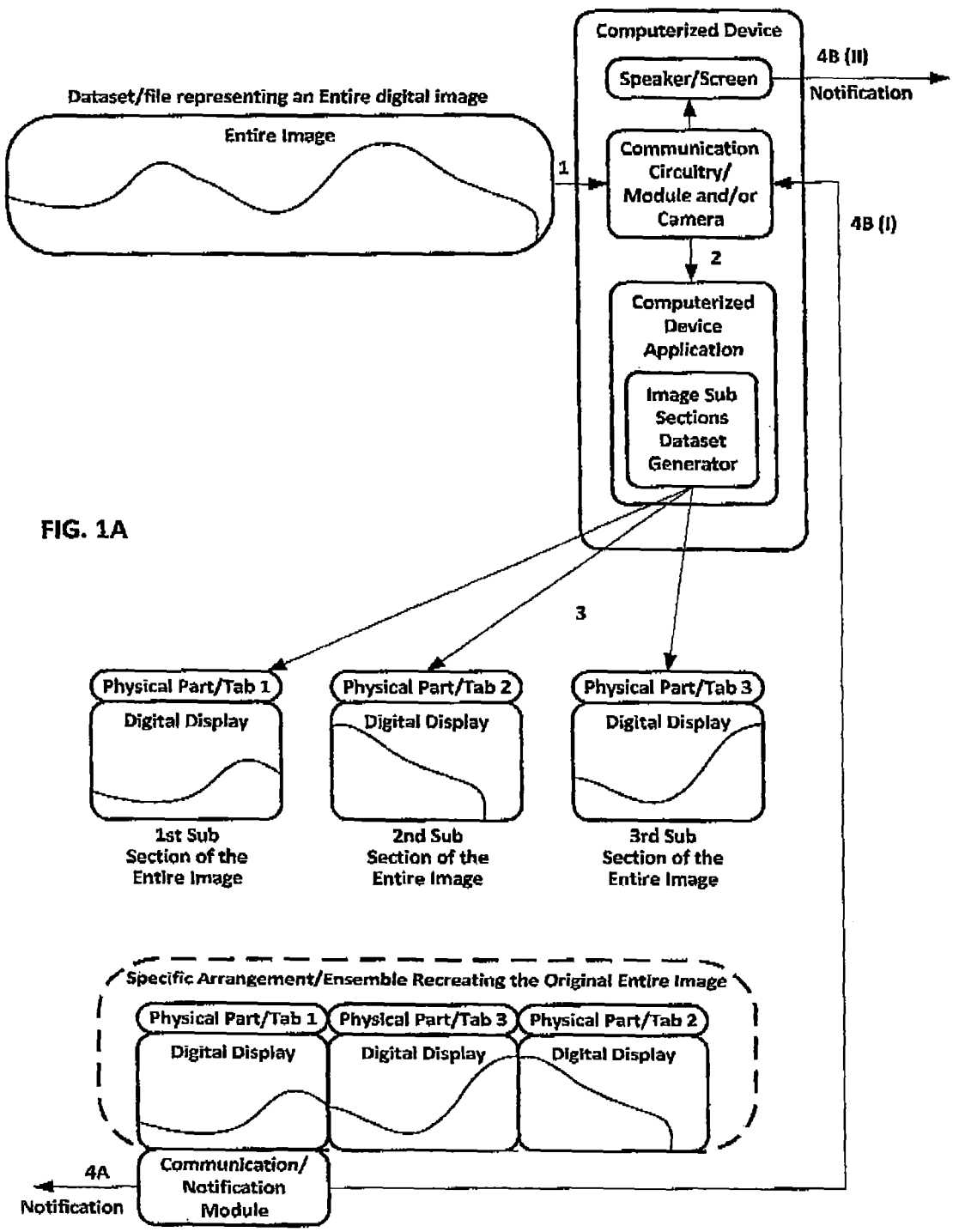
In FIG. 1A there is shown, in accordance with some embodiments, a multipart dynamic digital puzzle/jigsaw-puzzle system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals or element labeling may be repeated among the figures to indicate corresponding or analogous elements.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Unless specifically stated otherwise, as apparent from the following discussions, it is appreciated that throughout the specification discussions utilizing terms such as "processing", "computing", "calculating", "determining", or the like, may refer to the action and/or processes of a computer, computing system, computerized mobile device, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In addition, throughout the specification discussions utilizing terms such as "storing", "hosting", "caching", "saving", or the like, may refer to the action and/or processes of 'writing' and 'keeping' digital information on a computer or computing system, or similar electronic computing device, and may be interchangeably used. The term "plurality" may be used throughout the specification to describe two or more components, devices, elements, parameters and the like.

Some embodiments of the invention, for example, may take the form of an entirely hardware embodiment, an entirely software embodiment, or an embodiment including both hardware and software elements. Some embodiments may be implemented in software, which includes but is not limited to firmware, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device, for example a computerized device running a web-browser.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution. The memory elements may, for example, at least partially include memory/registration elements on the user device itself.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "includes", "including", "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present disclosure is to be considered as an exemplification of the invention, and is not intended to limit the invention to the specific embodiments illustrated by the figures or description below.

Disclosed is a multipart dynamic digital puzzle/jigsaw-puzzle. Two or more physical parts/tabs are each adapted to present, over a digital display functionally associated therewith, a sub section of a provided digital image. Such that the physical parts/tabs, when arranged in a specific orientation/arrangement, collectively recreate the original digital image from its sub sections.

A multipart dynamic digital puzzle/jigsaw-puzzle system, in accordance with some embodiments, may include a computerized device application for: receiving a dataset/file representing a digital image, generating two or more datasets/files each representing a sub section of the received digital image, and communicating each of the two or more datasets/files to a separate part/tab, of the two or more physical parts/tabs, for presentation.

A puzzle/jigsaw-puzzle part/tab, in accordance with some embodiments, may include one or more elements to facilitate/limit its physical connection/fitting/assembly with/to another puzzle/jigsaw-puzzle part/tab. Such elements may for example include: a specific physical shape (e.g. blank, hole, socket, knob, loop, key) complementing the shape of another puzzle/jigsaw-puzzle part/section, a graphic shape or symbol complementing/matching/completing the graphic shape or symbol of another puzzle/jigsaw-puzzle part/section.

According to some embodiments, the arrangement of the two or more physical parts/tabs, in the specific orientation that recreates the original digital image from its sub sections, may trigger a digital notification. The notification may be generated by one or more of the two or more physical parts/tabs and/or by the computerized device application in response to a successful/correct (i.e. recreates the original digital image) parts/tabs arrangement message received from one or more of the parts/tabs.

For example, the specific successful/correct parts/tabs arrangement may close an electric circuit—connected to an electric power source (e.g. a rechargeable battery) and optionally to a communication circuitry/module—triggering the communication/output of a corresponding message/notification indicating the completion of a successful/correct parts/tabs arrangement.

Reference is now made to FIG. 1A where there is shown, in accordance with some embodiments, a multipart dynamic digital puzzle/jigsaw-puzzle system. In the figure, there are shown: (1) A dataset/file representing an entire digital image received by a communication circuitry/module of a computerized device, or acquired by a digital camera of the device. (2) An application installed and running on the computerized device includes an image sub sections dataset/file generator for, (3) generating two or more datasets/files each representing a separate sub section of the entire received/acquired digital image and communicating each of the two or more datasets/files to a separate physical part/tab, for presentation over a digital display of that separate part/tab.

Arrangement of the physical parts/tabs in a specific arrangement/ensemble recreating the original entire image (as shown in the surrounding broken line), triggers: (4A) a notification by one or more of the physical parts/tabs, and/or (4B) communication of a notification request from one or more of the physical parts/tabs to the computerized device application, to generate a notification by an output component (e.g. display, speaker, vibrating motor) of the computerized device.

The two or more parts/tabs, in accordance with further embodiments, may be utilized to each present, over its respective display, one of multiple different images, each image representing a different component (e.g. parts, cards, cubes) of a multi-component game such as: different poker cards, different Remi cards, different memory game cards, etc. Puzzle parts/tabs may collectively present an educational question or exercise, for example, a mathematical exercise or a language related question. Positioning of additional parts/tabs of the same puzzle such that the solution to the exercise/question is presented by them, may trigger a corresponding notification indicating to the user that the answer is correct.

According to some embodiments, multiple puzzle parts/tabs may visually present/indicate specific information for each of a multi-member group, such as venue visitors, users, employees, etc. For example, students visiting the museum or going on a trip may each be supplied with his part/tab to present him with specific/relevant/personally-matched information and images. As another example, restaurant visitors may be supplied with such parts/tabs for receiving notifications associated with their table or order status.

Figure 1B:
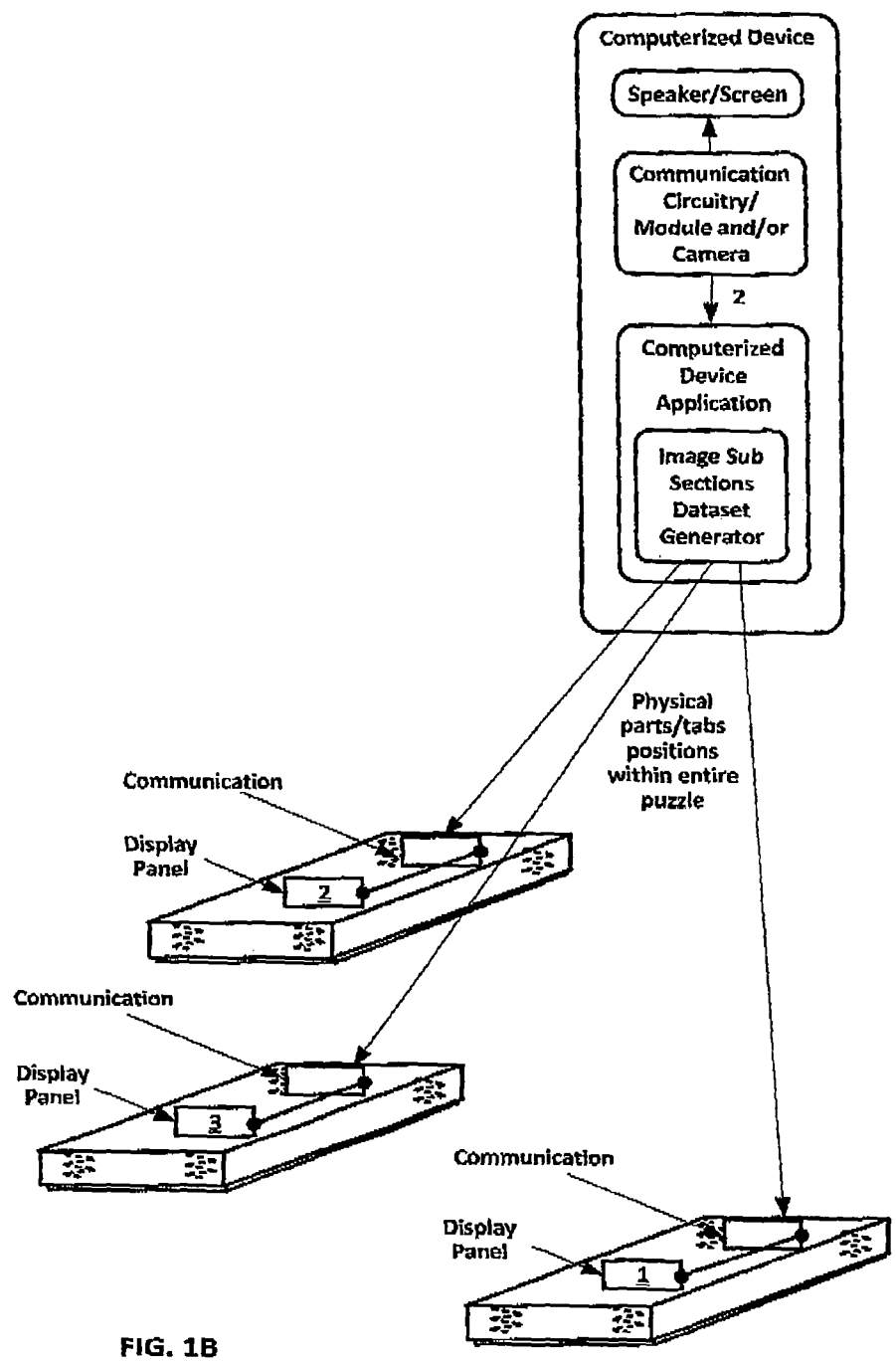
In FIG. 1B there is shown, in accordance with some embodiments, an exemplary multipart dynamic digital puzzle/jigsaw-puzzle system, wherein the image sub sections dataset generator is adapted to relay to the puzzle parts/tabs for presentation.

Reference is now made to FIG. 1B where there is shown, in accordance with some embodiments, an exemplary multipart dynamic digital puzzle/jigsaw-puzzle system, wherein the image sub sections dataset generator is adapted to relay to the puzzle parts/tabs for presentation, consecutive numbers/letters indicative of the correct arrangement of the parts/tabs for correctly completing the puzzle image.

Reference is now made to FIG. 1C where there is shown, in accordance with some embodiments, an exemplary multipart dynamic digital puzzle/jigsaw-puzzle system, wherein the parts/tabs, and their respective digital displays, are shaped in the form of classic jigsaw-puzzle matching pieces.

A puzzle/jigsaw-puzzle part/tab, in accordance with some embodiments, may comprise of a box/housing. The box may have a triangular, quadrilateral, pentagonal and/or any other polygon shape. The box may have a shape similar to that of a traditional jigsaw puzzle—including blank(s) (i.e. holes, sockets, locks, innies, or females), and/or tab(s) (i.e. knobs, loops, keys, outies, or males)—wherein multiple such part/tab boxes of a single puzzle may have a different traditional jigsaw puzzle shape. The shape of specific such part/tab boxes of a single puzzle may only fit/complement with the shape of other specific part/tab boxes of the same single puzzle.

A puzzle/jigsaw-puzzle part/tab, in accordance with some embodiments, may comprise a top box, including the digital display of the part/tab, and a complementary bottom box. The part/tab boxes may be both polygon shaped, or may both have a shape similar to that of a traditional jigsaw puzzle. According to some embodiments, the top box may include the digital display of the part/tab and may be polygon shaped, whereas the bottom box is shaped similarly to a traditional jigsaw puzzle such that it can only fit/complement with the shape of other specific part/tab boxes of the same single puzzle.

A puzzle/jigsaw-puzzle part/tab, in accordance with some embodiments, may comprise a top box and a complementary bottom box. The top and bottom boxes of the part/tab may be connected to each other by a mechanism for retaining them at two, or more, different vertical distances from each other. For example, a first retention position may keep the top and bottom boxes at a greater distance from each other, yielding a thicker part/tab; whereas a second retention position may keep the top and bottom boxes at a smaller distance from each other, optionally with one of the boxes at least partially contained by the other, yielding a thinner part/tab.

The retention mechanism may for example take the form of one or more retractable pen mechanisms, each comprising a spring, a thrust device, and a thrust tube. For example, a retractable pen mechanism may be positioned substantially at the center of the part/tab, or four different such mechanisms may be positioned along the edges of the part/tab or in proximity to each of the four corners of a rectangular/square shaped part/tab. Pressing the top box downward towards the bottom box may load the spring and lock the thrust device such that the two boxes at a retracted orientation (flat/thin part/tab), another pressing of the top box downward towards the bottom box may release the loaded spring to lock the thrust device such that the two boxes are at an extended orientation (thick part/tab).

Figure 2A:
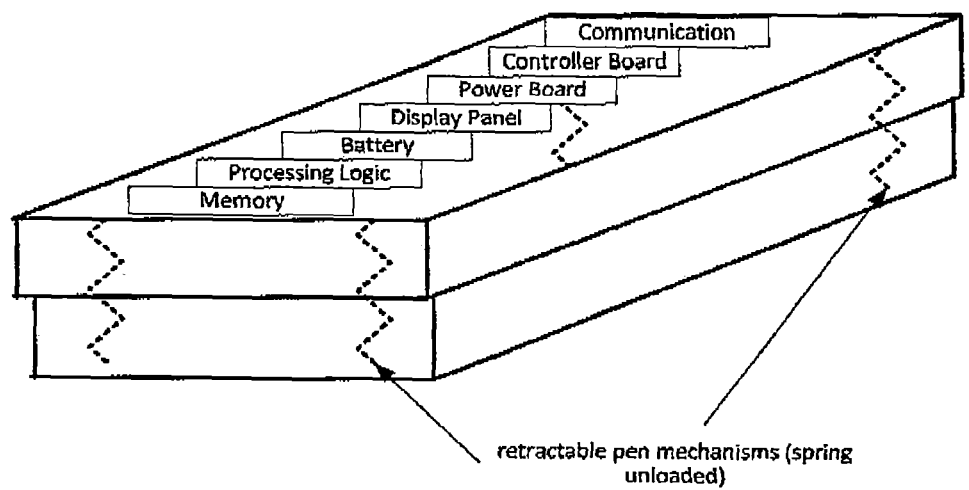
In FIG. 2A there is shown, in accordance with some embodiments, an exemplary part/tab of a multipart dynamic digital puzzle/jigsaw-puzzle, at an extended orientation (thick part/tab)

Reference is now made to FIG. 2A where there is shown, in accordance with some embodiments, an exemplary part/tab of a multipart dynamic digital puzzle/jigsaw-puzzle, at an extended orientation (thick part/tab).

Figure 2B:
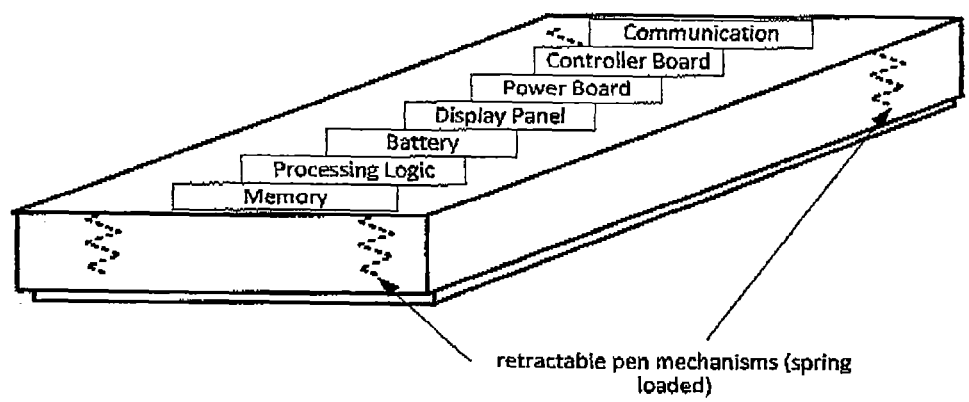
In FIG. 2B there is shown, in accordance with some embodiments, an exemplary part/tab of a multipart dynamic digital puzzle/jigsaw-puzzle, at a retracted orientation (flat/thin part/tab)

Reference is now made to FIG. 2B where there is shown, in accordance with some embodiments, an exemplary part/tab of a multipart dynamic digital puzzle/jigsaw-puzzle, at a retracted orientation (flat/thin part/tab).

The thick part/tab orientation (boxes more apart) may cause that specific part/tab to stick-out/protrude over the height of one or more other puzzle parts/tabs in its proximity, facilitating the easy grabbing of the part/tab's edges by the player, when inserting it into the puzzle and/or when removing it therefrom. When pressed down into its thin part/tab orientation (boxes less apart), the top surface of the specific part/tab zeros in with (i.e. assumes a similar height to) the top surfaces of other puzzle parts/tabs in its proximity, to collectively form a flat surface depicting the image of the puzzle.

Figure 3A:
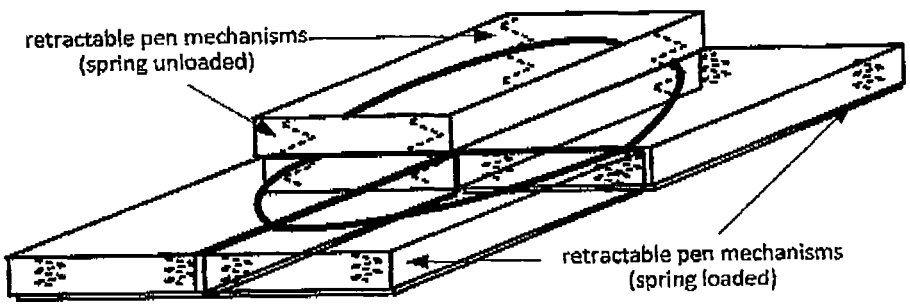
In FIG. 3A there is shown, in accordance with some embodiments, an exemplary multipart dynamic digital puzzle/jigsaw-puzzle, wherein three out of four parts are in a thin part/tab orientation (boxes less apart) and one part is in a thick part/tab orientation (boxes more apart)

Reference is now made to FIG. 3A where there is shown, in accordance with some embodiments, an exemplary multipart dynamic digital puzzle/jigsaw-puzzle, wherein three out of four parts are in a thin part/tab orientation (boxes less apart) and one part is in a thick part/tab orientation (boxes more apart).

Figure 3B:
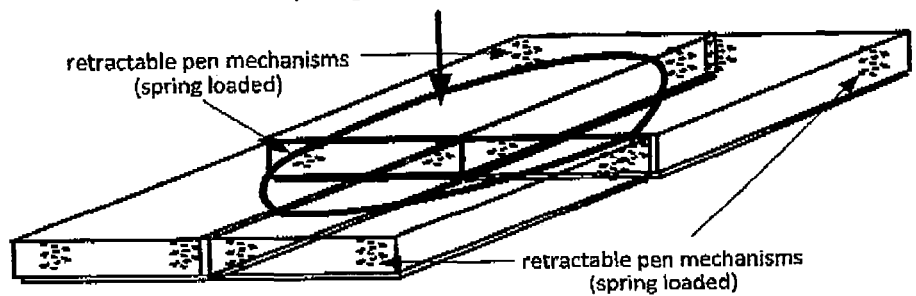
In FIG. 3B there is shown, in accordance with some embodiments, an exemplary multipart dynamic digital puzzle/jigsaw-puzzle, wherein all four parts are in a thin part/tab orientation (boxes less apart), collectively presenting the complete puzzle's image.

Reference is now made to FIG. 3B where there is shown, in accordance with some embodiments, an exemplary multipart dynamic digital puzzle/jigsaw-puzzle, wherein all four parts are in a thin part/tab orientation (boxes less apart), collectively presenting the complete puzzle's image.

The top box of a puzzle/jigsaw-puzzle part/tab, in accordance with some embodiments, may comprise one or more magnets along its edges. When in a thick part/tab orientation (boxes more apart), the top box magnets may be positioned at a higher vertical position/elevation than magnets of neighboring parts/tabs that are in a thin part/tab orientation (boxes less apart).

When the thickly oriented part's/tab's top box is pressed down, to assume its thin orientation, its top box magnets travel along therewith, to a similar vertical position/elevation as the magnets of the neighboring parts/units that are in a thin part/tab orientation (boxes less apart)—thereby triggering the retention/connection of the part's/unit's magnets to the magnets of its neighboring parts/tabs.

Figure 4A:
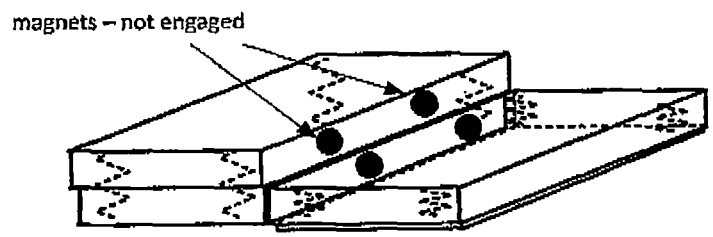
In FIG. 4A there is shown, in accordance with some embodiments, an exemplary multipart dynamic digital puzzle/jigsaw-puzzle, wherein two parts/tabs are adjacent to each other while one is in a thick orientation and the other is in a thin orientation.

Reference is now made to FIG. 4A where there is shown, in accordance with some embodiments, an exemplary multipart dynamic digital puzzle/jigsaw-puzzle, wherein two parts/tabs are adjacent to each other while one is in a thick orientation and the other is in a thin orientation—thus, their magnets are apart and not engaged/connected.

When the thinly oriented part's/tab's top box is pressed down again, to assume its thick orientation, its top box magnets travel along therewith, to a greater vertical position/elevation than the magnets of the neighboring parts/units that are in a thin part/tab orientation (boxes less apart)—thereby triggering the disconnection of the part's/unit's magnets from the magnets of its neighboring parts/tabs.

Figure 4B:
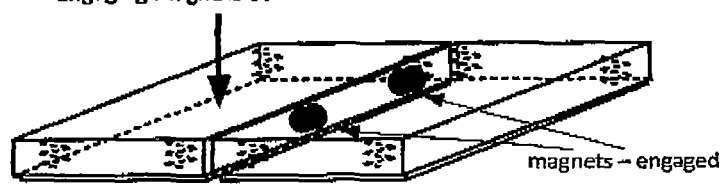
In FIG. 4B there is shown, in accordance with some embodiments, an exemplary multipart dynamic digital puzzle/jigsaw-puzzle, wherein two parts/tabs are adjacent to each other while the previously thickly oriented part/tab has been pressed into its thin orientation.

Reference is now made to FIG. 4B where there is shown, in accordance with some embodiments, an exemplary multipart dynamic digital puzzle/jigsaw-puzzle, wherein two parts/tabs are adjacent to each other while the previously thickly oriented part/tab has been pressed into its thin orientation, thereby positioning the two parts' magnets in proximity and engaged, connecting the parts/tabs to each other.

A puzzle/jigsaw-puzzle part/tab, in accordance with some embodiments, may comprise one or more protrusions/pins/shafts along its edges, structured to fit into one or more respective openings/holes on the edges of a neighboring part/tab. A given part/unit may comprise one or more protrusions/pins/shafts on one of its edges and one or more openings/holes on its opposite edge. The part/unit edge comprising openings/holes may, in accordance with embodiments, be negatively sloped/inclined (top surface area sticks out of bottom surface area) to assist the insertion of the part/unit into a puzzle's slot/position, optionally also enabling the insertion of the protrusions/pins/shafts into their neighboring part's/unit's openings/holes.

Figure 5A:
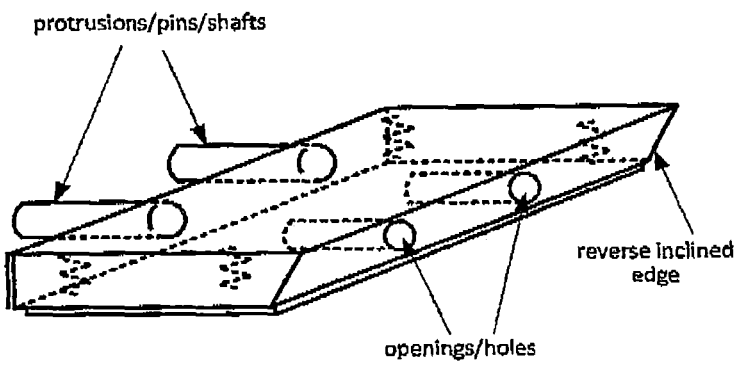
In FIG. 5A there is shown, in accordance with some embodiments, an exemplary multipart dynamic digital puzzle/jigsaw-puzzle, wherein a part/tab includes protrusions/pins/shafts structured to fit into complementing openings/holes of a neighboring part/tab.

Reference is now made to FIG. 5A where there is shown, in accordance with some embodiments, an exemplary multipart dynamic digital puzzle/jigsaw-puzzle, wherein a part/tab includes protrusions/pins/shafts structured to fit into complementing openings/holes of a neighboring part/tab.

Figure 5B:
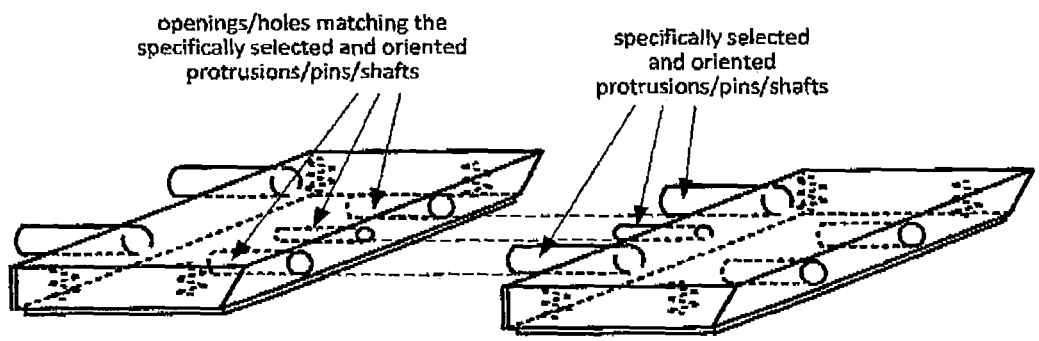
In FIG. 5B there is shown, in accordance with some embodiments, an exemplary multipart dynamic digital puzzle/jigsaw-puzzle, wherein a combination of specifically sized and positioned protrusions/pins/shafts fits into a combination of specifically sized and positioned complementing openings/holes of a neighboring part/tab.

Reference is now made to FIG. 5B where there is shown, in accordance with some embodiments, an exemplary multipart dynamic digital puzzle/jigsaw-puzzle, wherein a combination of specifically sized and positioned protrusions/pins/shafts fits into a combination of specifically sized and positioned complementing openings/holes of a neighboring part/tab. Specific protrusions/pins/shafts arrangements may disable the connection of that part/tab to one or more other parts/tabs of the puzzle.

According to some embodiments, pressing a puzzle/jigsaw-puzzle part's/tab's top box downward towards the bottom box may eject one or more protrusions/pins/shafts from their housings on the part's/tab's edge(s) to stick-out/protrude from the edges. Accordingly, a part/tab may be inserted into the puzzle in its thick orientation, and pressed down to eject the protrusions/pins/shafts out of its edges and into openings/holes on the edges of a neighboring part(s)/unit(s).

Figure 6A:
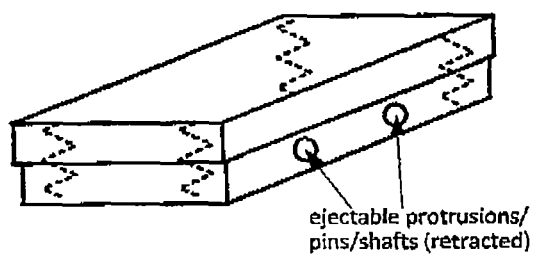
In FIG. 6A there is shown, in accordance with some embodiments, an exemplary part/tab, of a multipart dynamic digital puzzle/jigsaw-puzzle, including ejectable protrusions/pins/shafts shown in their retracted position.

Reference is now made to FIG. 6A where there is shown, in accordance with some embodiments, an exemplary part/tab, of a multipart dynamic digital puzzle/jigsaw-puzzle, including ejectable protrusions/pins/shafts shown in their retracted position.

Figure 6B:
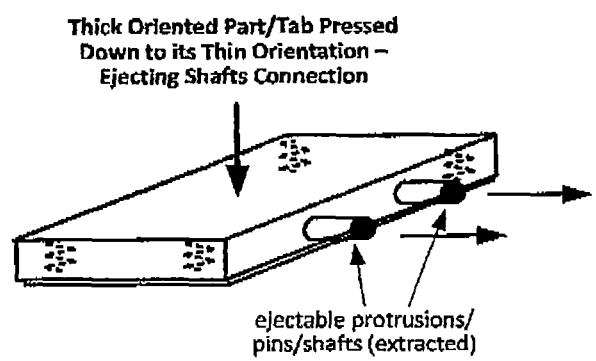
In FIG. 6B there is shown, in accordance with some embodiments, an exemplary part/tab, of a multipart dynamic digital puzzle/jigsaw-puzzle, including ejectable protrusions/pins/shafts shown in their extracted position.

Reference is now made to FIG. 6B where there is shown, in accordance with some embodiments, an exemplary part/tab, of a multipart dynamic digital puzzle/jigsaw-puzzle, including ejectable protrusions/pins/shafts shown in their extracted position, resulting from, the part's/tab's top box being pushed downward towards the bottom box into a thin part/tab orientation.

According to some embodiments, the protrusions/pins/shafts of a part/tab may be hook or T shaped, to catch/retain onto complementing hook or C shaped openings/holes of neighboring parts/units. The hook or T shaped protrusions/pins/shafts may, when the part/tab is in its thick orientation (boxes more apart), be positioned at a vertical height/elevation greater than the vertical height/elevation of the complementing hook or C shaped openings/holes of neighboring parts/units that are in a thin part/tab orientation (boxes less apart). Pressing the top box of the thickly oriented part/tab down may lower the hook or T shaped protrusions/pins/shafts to engage, and catch/retain onto, the hook or C shaped openings/holes of the neighboring parts/units.

Figure 7A:
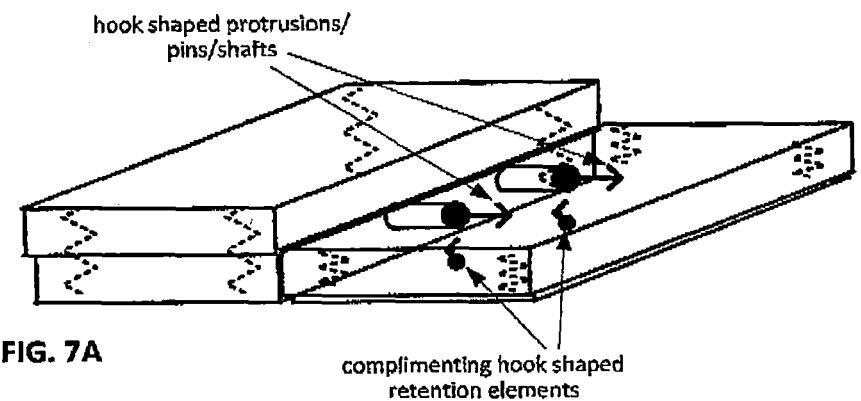
In FIG. 7A there is shown, in accordance with some embodiments, exemplary parts/tabs, of a multipart dynamic digital puzzle/jigsaw-puzzle, including hook shaped protrusions/pins/shafts shown in their not-retained position.

Reference is now made to FIG. 7A where there is shown, in accordance with some embodiments, exemplary parts/tabs, of a multipart dynamic digital puzzle/jigsaw-puzzle, including hook shaped protrusions/pins/shafts shown in their not-retained position.

Figure 7B:
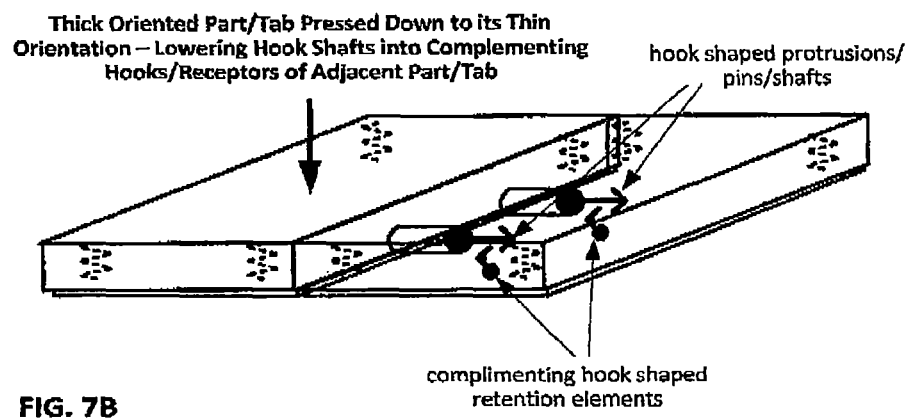
In FIG. 7B there is shown, in accordance with some embodiments, exemplary parts/tabs, of a multipart dynamic digital puzzle/jigsaw-puzzle, including hook shaped protrusions/pins/shafts shown in their retained position.

Reference is now made to FIG. 7B where there is shown, in accordance with some embodiments, exemplary parts/tabs, of a multipart dynamic digital puzzle/jigsaw-puzzle, including hook shaped protrusions/pins/shafts shown in their retained position—connected to complementing retention elements of an adjacent part/tab—resulting from the part's/tab's top box being pushed downward towards the bottom box into a thin part/tab orientation.

Figure 7C:
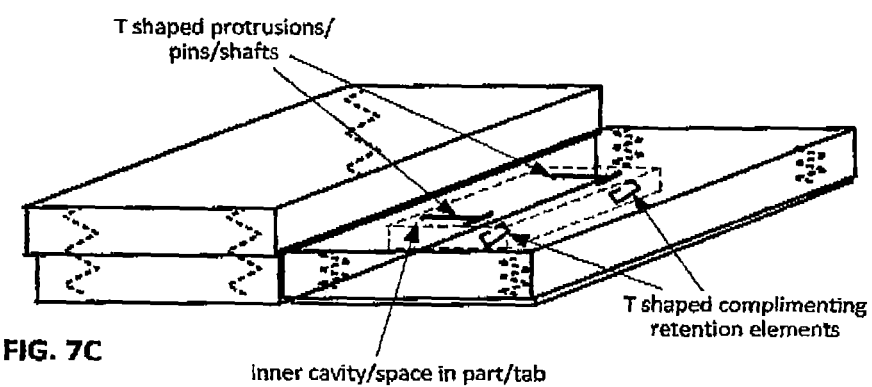
In FIG. 7C there is shown, in accordance with some embodiments, exemplary parts/tabs, of a multipart dynamic digital puzzle/jigsaw-puzzle, including T shaped protrusions/pins/shafts shown in their not-retained position.

Reference is now made to FIG. 7C where there is shown, in accordance with some embodiments, exemplary parts/tabs, of a multipart dynamic digital puzzle/jigsaw-puzzle, including T shaped protrusions/pins/shafts shown in their not-retained position.

Figure 7D:
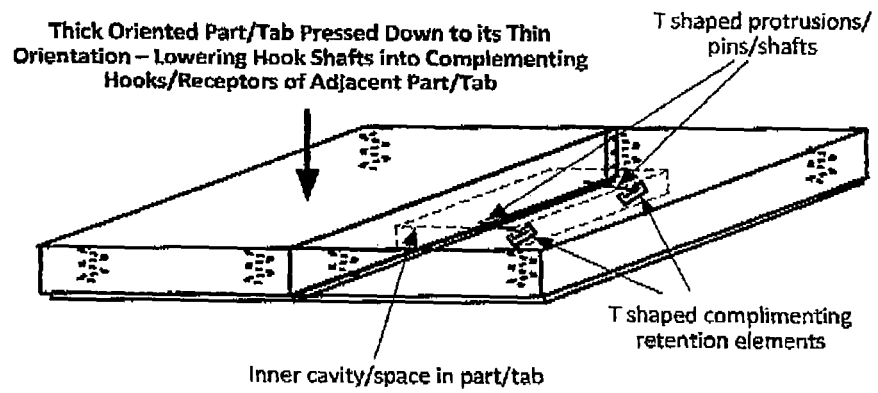
In FIG. 7D there is shown, in accordance with some embodiments, exemplary parts/tabs, of a multipart dynamic digital puzzle/jigsaw-puzzle, including T shaped protrusions/pins/shafts shown in their retained position—connected to complementing T shaped retention elements of an adjacent part/tab.

Reference is now made to FIG. 7D where there is shown, in accordance with some embodiments, exemplary parts/tabs, of a multipart dynamic digital puzzle/jigsaw-puzzle, including T shaped protrusions/pins/shafts shown in their retained position—connected to complementing T shaped retention elements of an adjacent part/tab—resulting from the part's/tab's top box being pushed downward towards the bottom box into a thin part/tab orientation.

According to some embodiments, each puzzle part/tab may comprise an electric power source such as a rechargeable battery. Puzzle parts/tabs, when positioned into a puzzle frame, may each connect to a respective charging connector. The frame's part/tab-charging connectors may each be connected to a charging circuitry/controller receiving power from an external power source.

Figure 8:
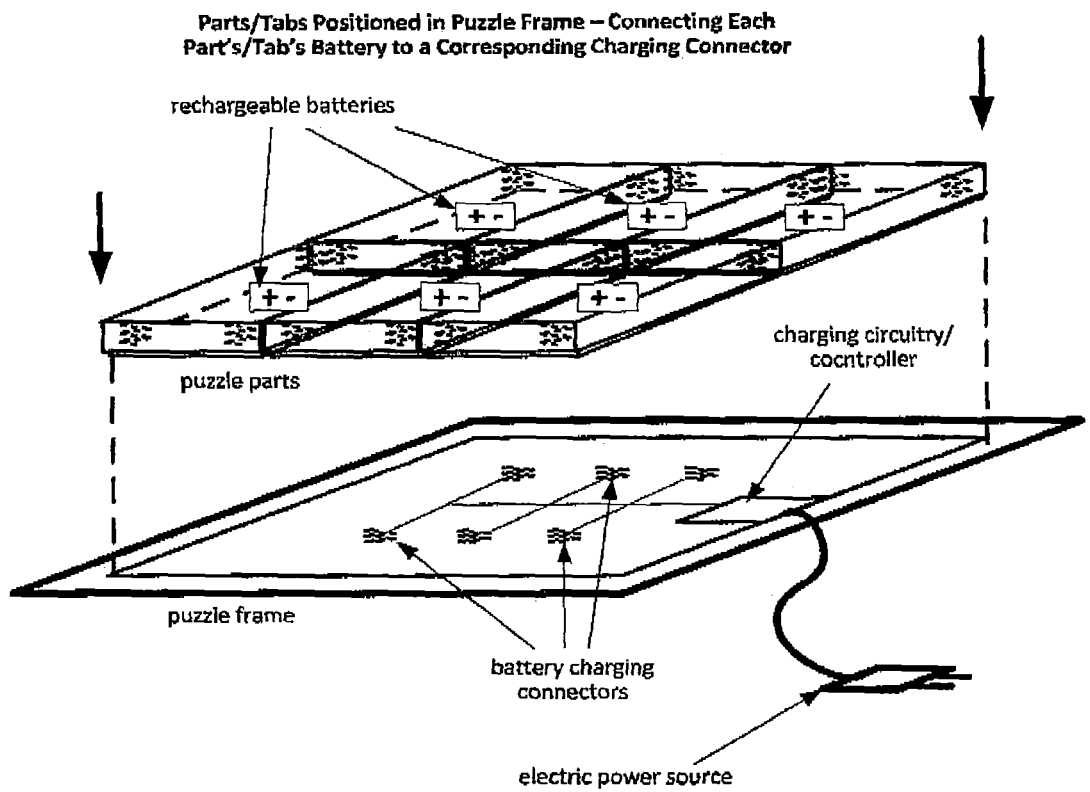
In FIG. 8 there is shown, in accordance with some embodiments, an exemplary multipart dynamic digital puzzle/jigsaw-puzzle system, wherein puzzle parts/tabs include rechargeable batteries that are charged upon their positioning into/onto a puzzle frame.

Reference is now made to FIG. 8 where there is shown, in accordance with some embodiments, an exemplary multipart dynamic digital puzzle/jigsaw-puzzle system, wherein puzzle parts/tabs include rechargeable batteries that are charged upon their positioning into/onto a puzzle frame.

An exemplary multipart dynamic puzzle/jigsaw-puzzle system, in accordance with further embodiments, may include paper or other sheets having precut lines, matching the shapes of parts/tabs of a precut hard board (e.g. hard board, card board, wood board, plastic board, etc.) puzzle. A user selected image may be printed onto a paper sheet having precut lines, printed parts/tabs cut along the precut lines and positioned/connected over/to (e.g. using glue, a decal, edged hard board parts/tabs, etc.) corresponding parts/tabs of the precut hard board. The hard board parts/tabs, including the paper images, may then be used to complete the image of the puzzle. Printed parts/tabs may be covered/held by a transparent cover of similar shape. According to some embodiments, images may be factory pre-printed and precut to match the parts/tabs of a corresponding hard board puzzle.

According to some embodiments, a user selected image may be printed onto a magnetic sheet having precut parts/tabs lines, and the corresponding parts/tabs of the precut hard board may likewise be magnetic or include a magnetic component/layer. Printed parts/tabs cut along the precut lines may be connected/retained to corresponding parts/tabs of the precut hard board by their magnetic properties.

Any of the solutions for connection and/or retention of puzzle parts/tabs of a multipart dynamic digital puzzle/jigsaw-puzzle described herein, may be likewise utilized for the connection and/or retention of puzzle parts/tabs of a multipart dynamic puzzle/jigsaw-puzzle, having paper/other printed image parts/tabs.

Figure 9:
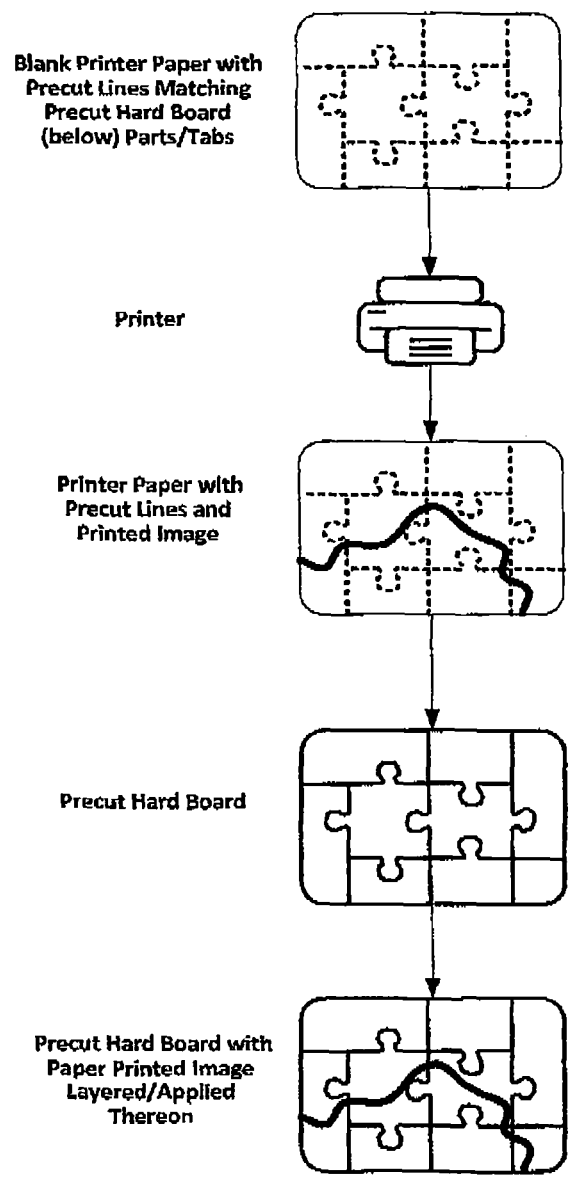
In FIG. 9 there is shown, in accordance with some embodiments, an exemplary multipart dynamic puzzle/jigsaw-puzzle system having printed image parts/tabs.

Reference is now made to FIG. 9 where there is shown, in accordance with some embodiments, an exemplary multipart dynamic puzzle/jigsaw-puzzle system. Initially shown is a blank printer paper with precut lines matching precut hard board parts/tabs. A user selected image is then printed over the blank paper. The printed image parts/tabs are layered/applied onto the shown precut hard board to form a precut hard board puzzle with the user selected image on it.

According to some embodiments, one more of the puzzle parts/tabs may include a channel and/or a hook positioned along one or more of its edges. The channel may be structured to accept and retain the hook structure of a neighboring puzzle part/tab, such that the connection adjacently attaches the two parts/tabs to each other. A given puzzle part/tab may include at least one edge having a channel structure and/or at least one edge having a hook structure. Multiple puzzle parts/tabs may accordingly attach to each other, using pairs of channel-hook edges, to collectively create columns, rows, or surfaces, of puzzle parts attached to each other.

The cross section of a puzzle part/tab, in accordance with embodiments, may take the shape of an upside-down trapezoid—small base on bottom and large base, with image, on top—such that a player/user applying pressure to the edge of a given part/tab may raise its opposite edge. The parts'/tabs' channels and hooks may be structured such that the pressing down and lowering of a puzzle part's/tab's edge having a hook structure may cause the hook to be likewise lowered, thereby disconnecting it from a channel structure of an adjacent other puzzle part/tab.

Figure 10A:
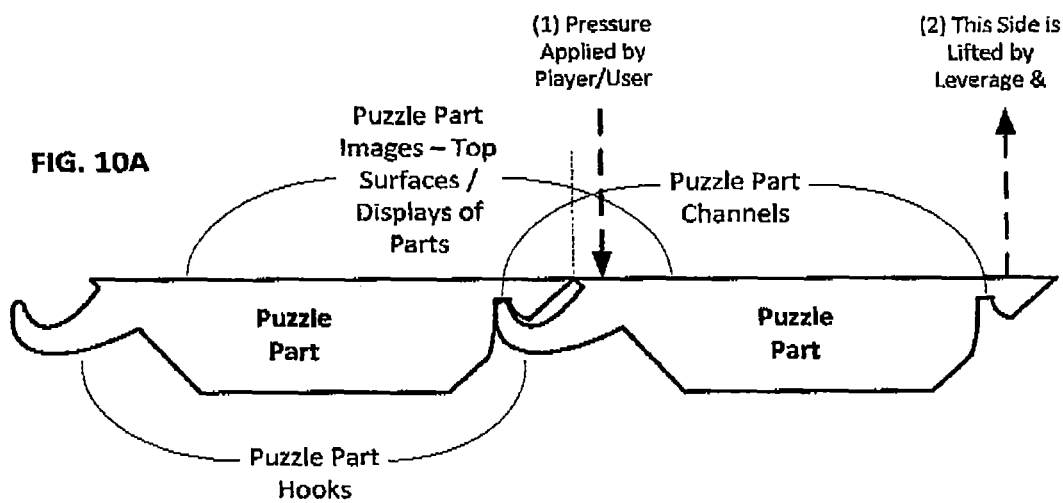
In FIG. 10A there is shown, in accordance with some embodiments, a cross section view of two exemplary puzzle parts/tabs, wherein one puzzle part's/tab's edge includes a hook structure, shown to be engaged with a channel structure on the edge of a neighboring part/tab, attaching the two parts/tabs to each other.

Reference is now made to FIG. 10A where there is shown, in accordance with some embodiments, a cross section view of two exemplary puzzle parts/tabs, wherein one puzzle part's/tab's edge includes a hook structure, shown to be engaged with a channel structure on the edge of a neighboring part/tab, attaching the two parts/tabs to each other. The channel structure is shown to accept and retain the hook structure of its neighboring/adjacent part/tab. The exemplary shown channel structure is shown to be wider at its opening, to easily accept the hook and lead/funnel it into its aspired final connected position within the neighboring part's/tab's channel.

Figure 10B:
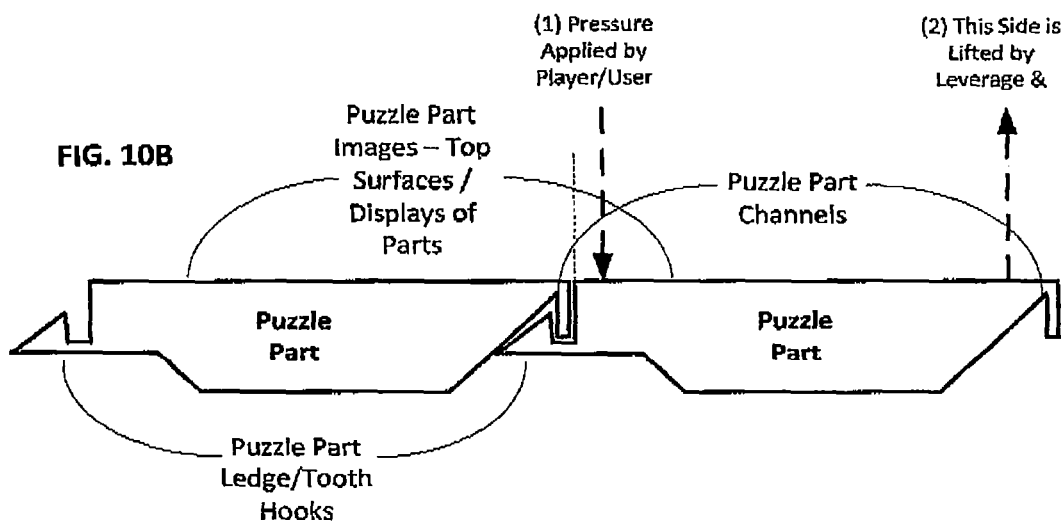
In FIG. 10B there is shown, in accordance with some embodiments, a cross section view of two exemplary puzzle parts/tabs, wherein one puzzle part's/tab's edge includes a ledge/tooth hook structure, shown to be engaged with a channel structure on the edge of a neighboring part/tab, attaching the two parts/tabs to each other.

Reference is now made to FIG. 10B where there is shown, in accordance with some embodiments, a cross section view of two exemplary puzzle parts/tabs, wherein one puzzle part's/tab's edge includes a ledge/tooth hook structure, shown to be engaged with a channel structure on the edge of a neighboring part/tab, attaching the two parts/tabs to each other. The channel structure is shown to accept and retain the ledge/tooth hook structure, of its neighboring/adjacent part/tab, by the shown substantially vertical down facing protrusion/pin/shaft/structure on the right edge of that neighboring/adjacent part/tab. The exemplary shown channel structure is shown to be wider at its opening and shaped to complement the ledge/tooth hook and lead/funnel/snap/click it into its aspired final connected position within the neighboring part's/tab's channel.

Figure 11A:
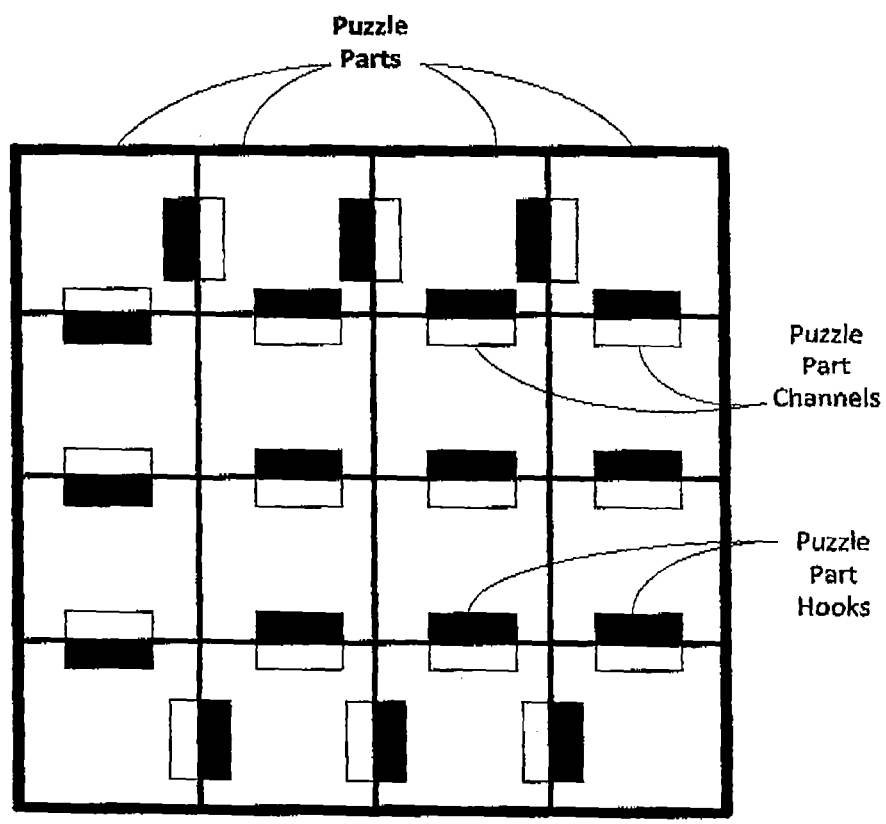
In FIG. 11A there is shown, a schematic view of an exemplary complete puzzle, in accordance with embodiments, wherein the parts/tabs of the puzzle are connected/attached to each other using a first specific exemplary layout/arrangement of hook-channel structures couples.

Reference is now made to FIG. 11A, where there is shown a schematic view of an exemplary complete puzzle, in accordance with embodiments, wherein the parts/tabs of the puzzle are connected/attached to each other using a first specific exemplary layout/arrangement of hook-channel structures couples. The hook structures in the figure are indicated by the black rectangles, whereas the channel structures are indicated by their adjacent non-filled white rectangles. In the figure, the outer parts/tabs of the puzzle are shown to be connected to each other to create a puzzle frame of connected parts/tabs. The internal—not in the frame—puzzle parts/tabs are shown to be connected at their lower and upper edges to create columns of connected parts/tabs. The created columns are connected to the top and bottom of the frame at their edges.

Figure 11B:
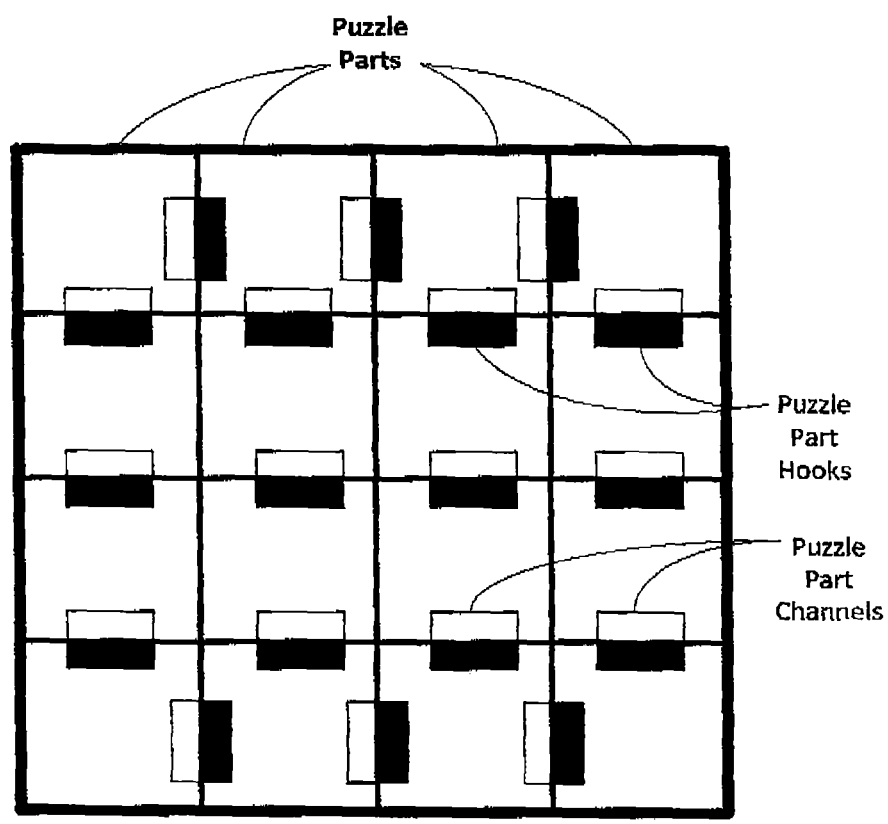
In FIG. 11B there is shown, a schematic view of an exemplary complete puzzle, in accordance with embodiments, wherein the parts/tabs of the puzzle are connected/attached to each other using a second specific exemplary layout/arrangement of hook-channel structures couples; and In FIG. 11C there is shown, a schematic view of an exemplary complete puzzle, in accordance with embodiments, wherein the parts/tabs of the puzzle are connected/attached to each other by a combination of different exemplary 'hook & channel' types.

Reference is now made to FIG. 11B, where there is shown a schematic view of an exemplary complete puzzle, in accordance with embodiments, wherein the parts/tabs of the puzzle are connected/attached to each other using a second specific exemplary layout/arrangement of hook-channel structures couples. The hook structures in the figure are indicated by the black rectangles, whereas the channel structures are indicated by their adjacent non-filled white rectangles. In the figure, the 4 upper parts/tabs of the puzzle are shown to be connected to each other to create a vertical puzzle frame top of connected parts/tabs, and, the 4 lower parts/tabs of the puzzle are shown to be connected to each other to create a vertical puzzle frame bottom of connected parts/tabs. The internal—not in the top/bottom of frame—puzzle parts/tabs are shown to be connected at their lower and upper edges to create columns of connected parts/tabs. The created columns are connected to the vertical puzzle frame top, and the vertical puzzle frame bottom, at their edges.

Figure 11C:
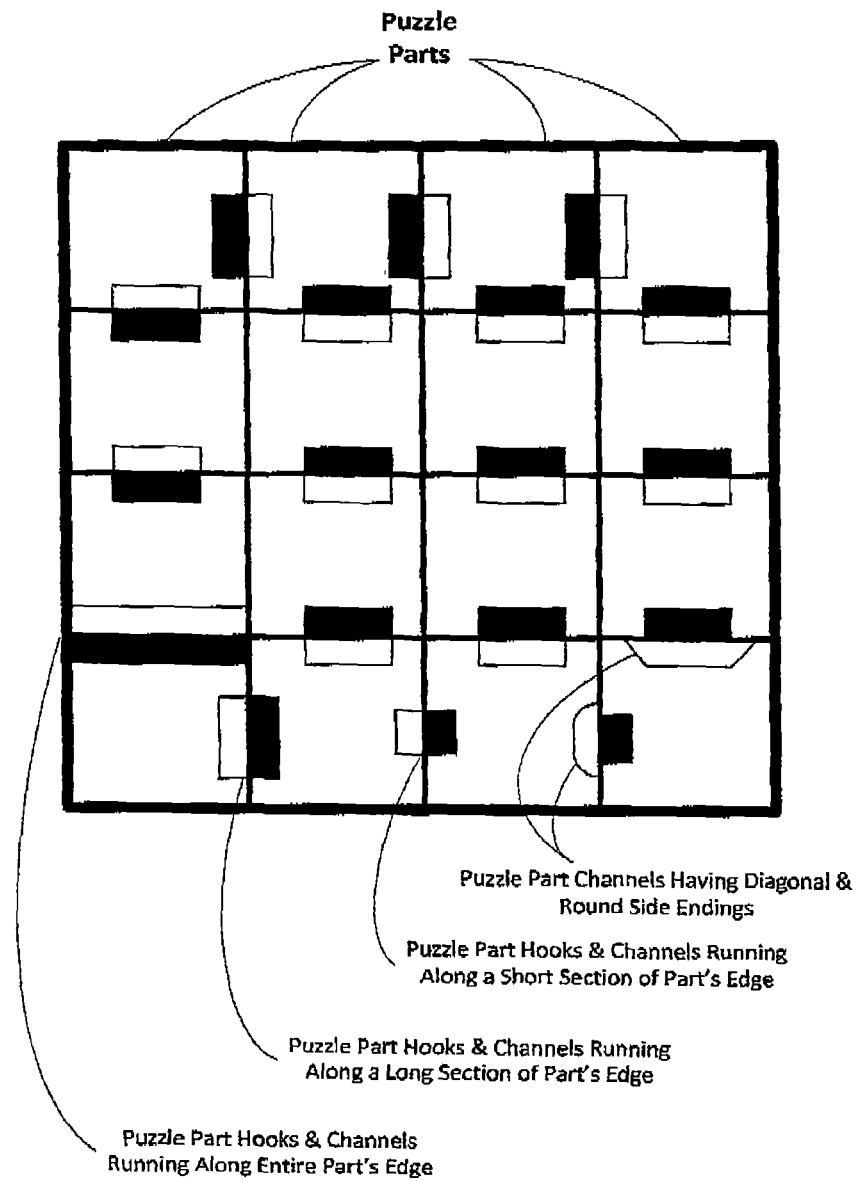

Reference is now made to FIG. 11C, where there is shown a schematic view of an exemplary complete puzzle, in accordance with embodiments, wherein the parts/tabs of the puzzle are connected/attached to each other by a combination of different exemplary 'hook & channel' types. Shown exemplary 'hook & channel' types include: puzzle part/tab hooks & channels running along entire part's/tab's edge, puzzle part/tab hooks & channels running along a long section of part's/tab's edge, puzzle part/tab hooks & channels running along a short section of part's/tab's edge, and puzzle part/tab channels having diagonal & round side endings.

According to embodiments of the present invention, parts/tabs of a specific puzzle may include, and be interconnected by, any combination of one or more of the shown 'hook & channel' types, optionally in combination with similar or other 'hook & channel' types.

According to some embodiments, a multipart dynamic digital puzzle, may comprise: two or more physical parts each configured to present, over a digital display functionally associated therewith, a sub section of a provided digital image; and a notification module to trigger a notification, upon the two or more parts being arranged in a specific arrangement collectively recreating the original digital image from its sub sections.

According to some embodiments, the multipart dynamic digital puzzle system may further comprise a computerized device application to: receive, via a communication module of the computerized device, the digital image, and to generate datasets representing two or more sub sections of the digital image; and relay each of the generated datasets to a respective one of the two or more physical parts for presentation over its digital display.

According to some embodiments, the notification module may be configured to communicate the notification to the computerized device application; and the computerized device application to output the notification through one or more of the computerized device's output components.

According to some embodiments, the multipart dynamic digital puzzle system may further comprise a computerized device application to: acquire, utilizing a camera of the computerized device, the digital image, and to generate datasets representing two or more sub sections of the digital image; and relay each of the generated datasets to a respective one of the two or more physical parts for presentation over its digital display.

According to some embodiments, the notification module may be configured to communicate the notification to the computerized device application; and the computerized device application to output the notification through one or more of the computerized device's output components.

According to some embodiments, at least some of the two or more physical parts may have specific physical shape complementing a specific physical shape of at least one other of the two or more physical parts.

According to some embodiments, the specific physical shape may include one or more physical elements, selected from the group consisting of: a blank, a hole, a socket, a knob, a loop, and a key.

According to some embodiments, at least some of the two or more physical parts may include a specific graphical shape complementing a specific graphical shape of at least one other of the two or more physical parts.

According to some embodiments, the specific arrangement of the physical parts collectively recreating the original digital image may close an electric circuit—connected to an electric power source—to trigger the notification.

According to some embodiments, the physical parts may each present, over its respective display, one of multiple different images, wherein each image represents a different component of a multi-component game.

According to some embodiments, each of the two or more physical parts may be configured to further present a subset of a set of consecutive symbols, indicative of the correct order of arrangement of the parts, for recreating the original digital image from its sub sections.

According to some embodiments, each of the two or more physical parts may comprise a top box and a complementary bottom box, wherein the top and bottom boxes are connected to each other by a mechanism for retaining them at two, or more, different vertical distances from each other.

According to some embodiments, the mechanism for retaining may include one or more retractable pen spring elements.

According to some embodiments, each of the two or more physical parts may comprise one or more magnets along its edges.

According to some embodiments, each of the two or more physical parts may comprise one or more openings and one or more protrusions along its edges.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A multipart dynamic digital puzzle, comprising:
   two or more physical parts each configured to present, over a digital display functionally associated therewith, a sub section of a provided digital image;
      wherein, at least some of said two or more physical parts, each includes one edge having a channel structure, one edge having a hook structure, and a cross section in the shape of an upside-down trapezoid having a small bottom base and a larger top base presenting the sub section of the provided image; and
   a notification module to trigger a notification, upon said two or more parts being arranged in a specific arrangement collectively recreating the original digital image from its sub sections.

2. The multipart dynamic digital puzzle system of claim 1, further comprising a computerized device application to:
   receive, via a communication module of the computerized device, the digital image, and to generate datasets representing two or more sub sections of the digital image; and
   relay each of the generated datasets to a respective one of said two or more physical parts for presentation over its said digital display.

3. The multipart dynamic digital puzzle system of claim 2, wherein:
   said notification module is configured to communicate the notification to said computerized device application; and
   said computerized device application to output the notification through one or more of the computerized device's output components.

4. The multipart dynamic digital puzzle system of claim 1, further comprising a computerized device application to:
   acquire, utilizing a camera of the computerized device, the digital image, and to generate datasets representing two or more sub sections of the digital image; and
   relay each of the generated datasets to a respective one of said two or more physical parts for presentation over its said digital display.

5. The multipart dynamic digital puzzle system of claim 4, wherein:
   said notification module is configured to communicate the notification to said computerized device application; and
   said computerized device application to output the notification through one or more of the computerized device's output components.

6. The multipart dynamic digital puzzle system of claim 1, wherein at least some of said two or more physical parts have specific physical shape complementing a specific physical shape of at least one other of said two or more physical parts.

7. The multipart dynamic digital puzzle system of claim 6, wherein the specific physical shape includes one or more physical elements, selected from the group consisting of: a blank, a hole, a socket, a knob, a loop, and a key.

8. The multipart dynamic digital puzzle system of claim 1, wherein at least some of said two or more physical parts include a specific graphical shape complementing a specific graphical shape of at least one other of said two or more physical parts.

9. The multipart dynamic digital puzzle system of claim 1, wherein the specific arrangement of said physical parts collectively recreating the original digital image closes an electric circuit—connected to an electric power source—to trigger the notification.

10. The multipart dynamic digital puzzle system of claim 1, wherein said physical parts each present, over its respective display, one of multiple different images, wherein each image represents a different component of a multi-component game.

11. The multipart dynamic digital puzzle system of claim 1, wherein each of said two or more physical parts is configured to further present a subset of a set of consecutive symbols, indicative of the correct order of arrangement of the parts, for recreating the original digital image from its sub sections.

12. The multipart dynamic digital puzzle system of claim 1, wherein each of said two or more physical parts comprises a top box and a complementary bottom box, wherein the top and bottom boxes are connected to each other by a mechanism for retaining them at two, or more, different vertical distances from each other.

13. The multipart dynamic digital puzzle system of claim 12, wherein said mechanism for retaining includes one or more retractable pen spring elements.

14. The multipart dynamic digital puzzle system of claim 1, wherein each of said two or more physical parts comprises one or more magnets along its edges.

15. The multipart dynamic digital puzzle system of claim 1, wherein each of said two or more physical parts comprises one or more openings and one or more protrusions along its edges.

\* \* \* \* \*